US006258004B1

(12) United States Patent
Johnston

(10) Patent No.: US 6,258,004 B1
(45) Date of Patent: Jul. 10, 2001

(54) CONSTANT OUTPUT TRANSMISSION APPARATUS

(76) Inventor: Thomas A. Johnston, 745 Palomar La., Colorado Springs, CO (US) 80906

( * ) Notice: Subject to any disclaimer, the term of this patent is extended or adjusted under 35 U.S.C. 154(b) by 0 days.

(21) Appl. No.: 09/468,105

(22) Filed: Dec. 21, 1999

(51) Int. Cl.[7] .................................................. F16H 48/20

(52) U.S. Cl. ........................... 475/218; 475/91; 475/208; 475/219; 475/302; 475/330

(58) Field of Search ............................ 475/91, 207, 208, 475/211, 218, 219, 302, 330

(56) References Cited

U.S. PATENT DOCUMENTS

| | | | | |
|---|---|---|---|---|
| 3,298,251 | * | 1/1967 | Moss ....................................... | 475/77 |
| 3,786,696 | * | 1/1974 | Aleem ..................................... | 475/77 |
| 4,587,866 | * | 5/1986 | Kraus ..................................... | 475/208 |
| 4,598,610 | * | 7/1986 | Kim ....................................... | 475/330 |
| 4,774,855 | * | 10/1988 | Murrell et al. ....................... | 475/77 X |
| 4,787,271 | * | 11/1988 | Brogdon ................................ | 475/140 |
| 5,030,180 | * | 7/1991 | Jonhston ................................ | 475/91 |
| 5,766,108 | * | 6/1998 | Jonhston ................................ | 475/91 |

* cited by examiner

Primary Examiner—Charles A Marmor
Assistant Examiner—Ha Ho
(74) Attorney, Agent, or Firm—Phillip A. Rein

(57) ABSTRACT

A constant output transmission apparatus operable to transform a variable RPM input to an input shaft member through the use of double planetary gear set means and the use of a low range gear and clutch assembly and a high range gear and clutch assembly to transfer output through a ring gear and carrier assembly and an output ring gear assembly to an output shaft assembly to provide a constant RPM output to an output shaft member. The variable input to the input shaft member is constantly causing rotation of an input carrier plate assembly driving input planet gear members and, concurrently, driving an input drive gear assembly. The input gear drive assembly is operable to concurrently drive a low range gear and clutch assembly and a high range gear and clutch assembly. On activation of a respective low range clutch piston or a high range clutch piston, this operates to selectively operate and rotate a respective low range clutch assembly and a high range clutch assembly. This operates through the rotating input planet gear members and output planet gear members to rotate the output ring gear assembly and the ring gear and carrier assembly to provide the constant output to the output shaft member. A second embodiment of a constant output transmission assembly uses a single planetary gear set means, a single viscous clutch means, and one output ring gear assembly to achieve the constant RPM output.

14 Claims, 2 Drawing Sheets

CONSTANT OUTPUT TRANSMISSION APPARATUS

PRIOR ART

A patent search was not conducted on this invention. The applicant herein has obtained 1) U.S. Pat. No. 5,030,180 issued Jul. 9, 1991, entitled "Variable Transmission Apparatus"; 2) U.S. Pat. No. 5,299,985, issued Apr. 5, 1994, entitled "Continuously Variable Transmission Apparatus"; and 3) U.S. Pat. No. 5,766,108, issued Jun. 16, 1998, entitled "Continuously Variable Transmission Utilizing Variable Viscous Coupling".

PREFERRED EMBODIMENT OF THE INVENTION

In one preferred embodiment of this invention, a constant output transmission apparatus utilizes one or more variable viscous clutch couplings with one or more power planetary gear set means to achieve a constant RPM power output from a variable RPM power input.

Figure 1:
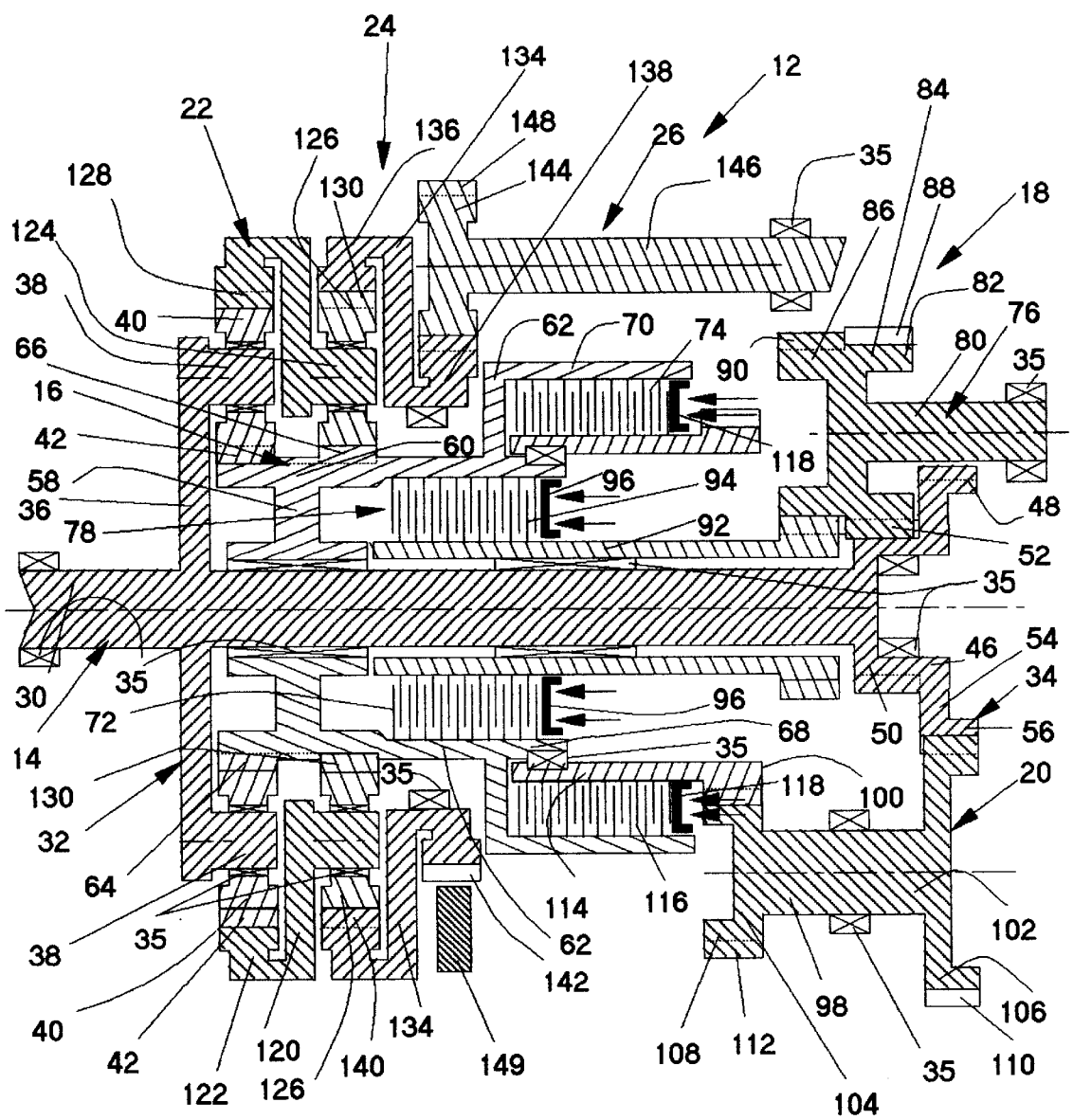

As noted in FIG. 1, the constant output transmission apparatus includes 1) an input drive and gear shaft assembly; 2) a sun gear and clutch assembly; 3) a low range gear and clutch assembly; 4) a high range gear and clutch assembly; 5) a ring gear and carrier assembly; 6) an output ring gear assembly; and 7) an output shaft assembly.

The input drive and gear shaft assembly includes 1) an input shaft member mounted on bearing members for ease of rotation thereof; 2) an input carrier plate assembly integral with the input shaft member; and 3) an input gear drive assembly integral with an outer end of the input shaft member.

The input carrier plate assembly includes 1) an input plate member extended laterally of and integral with the input shaft member; 2) input planet support shafts formed in and extended laterally from an outer portion of the input plate member; and 3) input planet gear members rotatably mounted on respective ones of the input planet support shafts.

It is found that the use of no less than two (2) of the input planet gear members are necessary to provide the required support to a ring gear member engaging the planet gear members as will be described.

Each planet gear member includes outer input gear tooth members thereon and mounted by a bearing member to the respective ones of the input planet support shafts.

The input gear drive assembly includes 1) a low range gear drive section; 2) a high range gear drive section; and 3) a bearing member which provides support and ease of rotation to an outer end of the input shaft member.

The low range gear drive section is provided with a low gear drive member having gear tooth members thereon. The high range gear drive section is provided with a high gear drive member having gear tooth members thereon.

The low range and high range gear drive sections are each operable to provide respective power input to a first portion of a clutch means as will be explained.

The sun gear and clutch assembly includes 1) a sun gear support body; 2) a sun gear member integral with the sun gear support body; and 3) a clutch support body.

The sun gear support body is mounted on bearing members mounted between itself and the input shaft member to allow relative rotation therebetween.

The sun gear member has a pair of adjacent sun planet drive gear teeth thereon.

The clutch support body is provided with 1) a low range clutch section; and 2) a high range clutch section which is part of a respective clutch means as will be explained.

The low range clutch section is provided with low range clutch plates and the high range clutch section is provided with high range clutch plates which are operable in a manner to be explained.

The low range gear and clutch assembly includes 1) a low range input gear assembly; and 2) a low range clutch assembly which is part of the clutch means.

The low range input gear assembly includes a low range shaft member mounted on a bearing member for ease of rotation. This low range shaft member is integral with a low range gear member and can be rotatably connected to a transmission housing or the like and operable to transfer power input from the input gear drive assembly to the low range clutch assembly as will be explained.

The low range gear member has a driven gear section and a drive gear section. The driven gear section has driven gear tooth members thereon and the drive gear section has drive gear tooth members thereon. Power is being transferred from the input gear drive assembly and the input shaft member through the driven gear section and drive gear section to the low range clutch assembly.

The low range clutch assembly includes a clutch support body having mounted thereon low range viscous clutch plates which are activated by a low range clutch piston as will be explained.

The clutch support body is mounted on bearing members between itself and the input shaft member to achieve relative rotation therebetween.

The activation of the low range clutch piston is controlled through a governor or speed monitoring device that is known in the prior art which will achieve a constant rotational speed output (revolutions per minute or RPM) in the output shaft assembly. This will be through the use of the low range and high range gear and clutch assemblies as will be explained.

The high range gear and clutch assembly includes 1) a high range input gear assembly; and 2) a high range clutch assembly. The high range input gear assembly includes a high range shaft member having an integral high range gear member on an outer end thereof.

The high range shaft member is mounted on a bearing member for ease of rotation and may be mounted on a part of the transmission housing in a conventional manner.

The high range gear member is provided with a driven gear portion and a drive gear portion. The driven gear portion had driven teeth members which are engaged and rotated through the high range gear drive section. This results in output in the driven gear portion which drives the high range clutch assembly which is part of a clutch means.

The high range clutch assembly includes 1) a high clutch support body mounted on a bearing member about a central portion of the input shaft member; 2) high range viscous clutch plates connected to the high clutch support body; and 3) a high range clutch piston engageable with the high range viscous clutch plates in a manner to be explained to form a portion of the clutch means.

The ring gear and carrier assembly includes a ring carrier plate member having integral therewith a ring gear member and ring carrier planet support shafts, each respectively having an output planet gear member connected thereto.

The ring gear member has ring gear tooth members on an inner surface thereof engageable with the respective input planet gear members cooperating in a manner to be explained.

The output planet gear members, mounted on respective bearing members, are formed with planet gear tooth members which are engageable with the output ring gear assembly as will be explained.

The output planet gear members are driven through engagement with the sun gear teeth on the sun gear member as will be explained.

The output ring member assembly includes an output support plate member having integral on one side thereof an input drive ring gear member and, on an opposite side, an output drive gear member.

The input drive ring gear member includes input gear tooth members driven by the output planet gear members. The output drive gear member has output gear tooth members operable to engage and drive the output shaft assembly.

The output shaft assembly includes an output driven gear member integral with an output shaft member. The output driven gear member has a plurality of drive gear tooth members thereon. The output shaft member is mounted on bearing members connected to a transmission housing or similar structure.

The output shaft member is maintained as a constant output, such as a constant RPM, which is monitored by a known constant speed measuring device such as a governing device or other similar electronic structure which can be driven by connection to the output drive gear member.

The main purpose of maintaining the constant output of the output shaft member is to drive a device that benefits from the constant input. In fact, the input to the input shaft member may be constantly variable, such as power from turbine engine on an airplane, whereas the output to the output shaft member is desired to be a constant RPM, such as for operating a generator to provide constant output to an airplane's electrical system.

Figure 2:
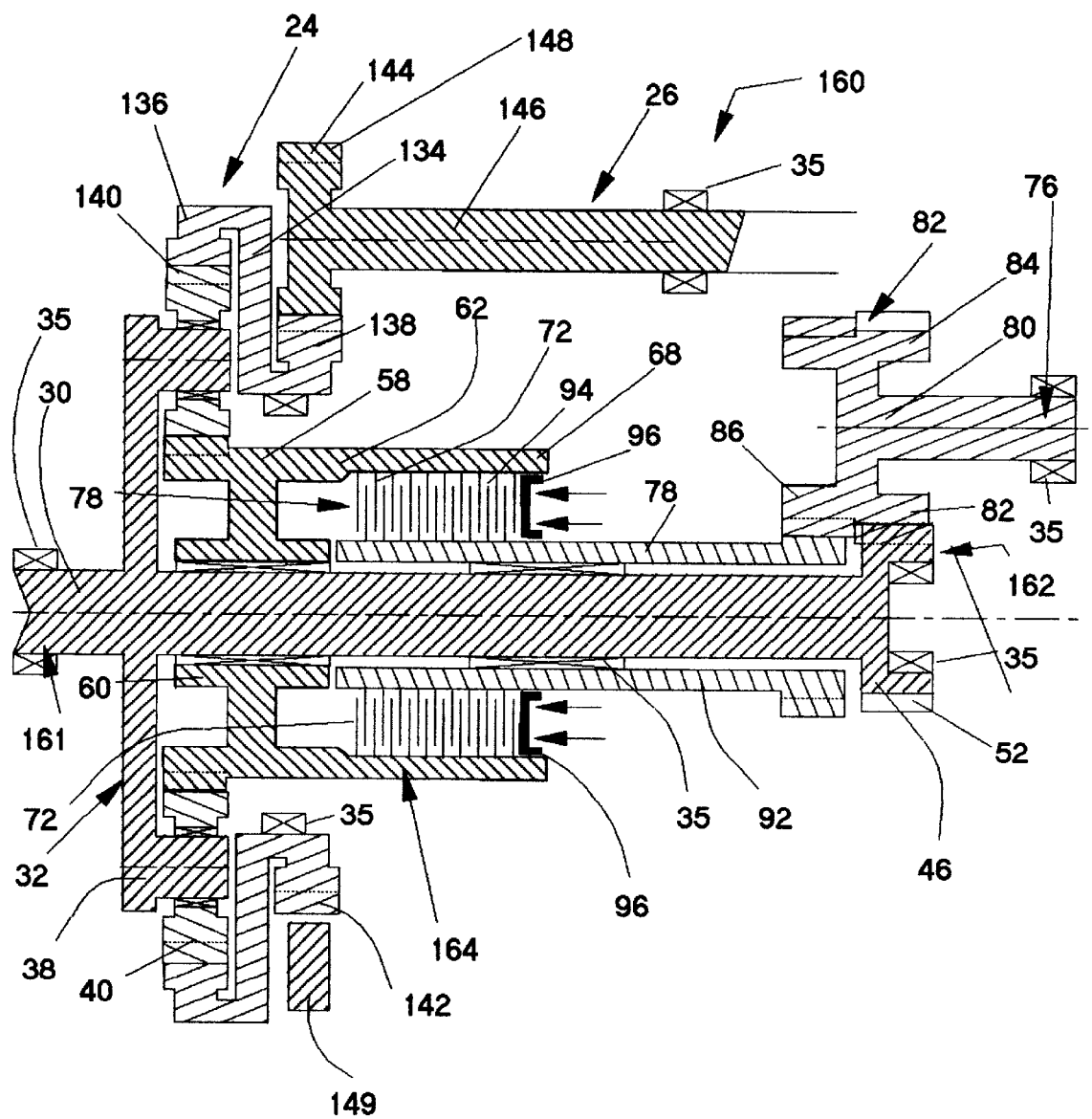

A second embodiment of this invention is shown in FIG. 2 being a constant output transmission assembly having many of the elements of the first embodiment of FIG. 1 but having certain elements therein removed and, thus, this second embodiment is not as efficient as the embodiment of FIG. 1 but completely satisfactory for numerous uses.

In the embodiment of FIG. 2, we have found that we could utilize only one viscous clutch means and one output to drive the one clutch means from a rotating input shaft member. Also, we only need to utilize a single output from a sun gear and clutch assembly and a single one of the ring gear and carrier assembly and, thus, eliminate the output ring gear assembly.

More specifically in the embodiment of FIG. 2, being the constant output transmission assembly, it can be utilized without the following assemblies utilized in the embodiment of FIG. 1, namely, 1) the output ring gear assembly; 2) the high range shaft assembly; 3) the high range clutch piston; 4) the high range clutch sleeve assembly; 5) the high range clutch housing; 6) the high range drive gear; and 7) the high range clutch assembly.

Therefore, the embodiment of FIG. 2 is not as expensive to manufacture; utilizes one set of cooperating clutch plates; and though it is more inexpensive to manufacture and requires less in maintenance cost thereto, it is not as efficient in operation as the embodiment in FIG. 1.

OBJECTS OF THE INVENTION

One object of this invention is to provide a constant output transmission apparatus that can receive a power input from a rotating turbine shaft on a commercial jet airline and providing an output through an output shaft member of a constant RPM to drive an electrical generator to provide, for example, constant electrical power within a commercial air jet.

Another object of this invention is to provide a constant output transmission apparatus including 1) an input drive and gear shaft assembly to receive power and rotation from a widely variable power source such as a jet propulsion engine; 2) a sun gear and clutch assembly engageable with the input drive and gear shaft assembly to rotate a respective portion of viscous low range and high range clutch plates; 3) a low range gear and clutch assembly connected to one portion of the input drive and gear shaft assembly to provide rotation to a second set of low range viscous clutch plates; 4) a high range gear and clutch assembly engageable with a second portion of the input drive and gear shaft assembly to provide rotation to a second set of high range viscous clutch plates; 5) a ring gear and carrier assembly engageable with input planet gear members and supporting output planet gear members thereon; 6) an output ring gear assembly engageable with the output planet gear members; and 7) an output shaft assembly engageable with a drive portion of the output ring gear assembly to provide constant RPM rotation to an output shaft member.

One other object of this invention is to provide a second embodiment being a constant output transmission assembly operable to receive a variable power input to an input shaft member and, through a planetary gear set means and a viscous clutch means, achieve a constant output RPM to an output shaft member which may be utilized to drive a generator to power a constant output electrical system.

A further object of this invention is to provide a constant output transmission assembly similar to the first embodiment of a constant output transmission apparatus but requiring less moving parts thus being easier to maintain, less expensive to manufacture and less maintenance requirements.

Still, one other object of this invention is to provide a constant output transmission apparatus which is sturdy in construction; provided with a minimum amount of movable parts relative to other power transmission structures; utilizing 1) one or two variable viscous clutch coupling means; and 2) one or two planetary gear set means to drive an output shaft member at a constant RPM; being economical to manufacture; and substantially maintenance free.

Various other objects, advantages, and features of the invention will become apparent to those skilled in the art from the following discussion, taken in conjunction with the accompanying drawings, in which:

FIGURES OF THE INVENTION

FIG. 1 is a cross sectional view of a constant output transmission apparatus of this invention; and FIG. 2 is a cross sectional view of a second embodiment, being a constant output transmission assembly.

The following is a discussion and description of preferred specific embodiments of the constant output transmission apparatus and the constant output transmission assembly of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

On referring to the drawings in detail, and in particular to FIG. 1, a constant output transmission apparatus of this invention, indicated generally at 12, is operable to receive a continuously variable power input and transfer this variable input to a constant output RPM shaft as will be explained.

The continuously variable power input supply may be from a rotating jet turbine engine on a commercial aircraft and the constant RPM output shaft could be used to drive an electrical generator to provide power to the electrical system on the commercial aircraft.

The constant output transmission apparatus 12 includes 1) an input drive and gear shaft assembly or means 14; 2) a sun gear and clutch assembly or means 16 rotatably mounted about the input drive and gear shaft assembly 14; 3) a low range gear and clutch assembly or means 18 operably connected to the input drive and gear shaft assembly 14; 4) a high range gear and clutch assembly or means 20 operably connected to the input drive and gear shaft assembly 14; 5) a ring gear and carrier assembly or means 22 operably connected to the input drive and gear shaft assembly 14 and the sun gear and clutch assembly 16; 6) an output ring gear assembly or means 24 operably connected to the ring gear and carrier assembly 22; and 7) an output shaft assembly or means 26 engageable with an output portion of the output ring gear assembly 24 to achieve a constant RPM output to an output shaft member as will be noted.

The input drive and gear shaft assembly 14 includes 1) an input shaft member 30; 2) an input carrier plate assembly 32 being integral with the input shaft member 30; and 3) an input gear drive assembly 34 integral with an outer end of the input shaft member 30.

An input end to the input shaft member 30 is mounted on a bearing member 35 for ease of rotation thereof The bearing member 35 can be connected to a portion of a transmission housing, not shown, in a conventional manner.

The input carrier plate assembly 32 includes 1) an input plate member 36 integral with and extended laterally of the input shaft member 30; 2) input planet support shafts 38 extended laterally and adjacent outer portions of the input plate member 36; and 3) input planet gear members 40 rotatably mounted on respective ones of the input planet support shafts 38 by bearing members 35.

The input planet gear members 40 each have outer input gear tooth members 42 thereon which are engageable with a portion of the ring gear and carrier assembly 22 as will be explained.

In this type of transmission structure, the number of the input planet gear members 40 can be two or more but, preferably, there would be provided three or four to provide substantial contact and support with the ring gear and carrier assembly 22 as will be noted.

The input gear drive assembly 34 includes a low range gear drive section 46 and a high range gear drive section 48 and utilizing a bearing member 35 to provide for rotational support thereto.

The low range gear drive section 46 is provided with a low range gear drive member 50 having low range gear tooth members 52 thereon. The high range gear drive section 48 has a high range gear drive member 54 having high gear tooth members 56 thereon.

The sun gear and clutch assembly 16 includes 1) a sun gear support body 58; 2) a sun gear member 60 integral with the sun gear support body 58; and 3) a clutch support body 62 integral and extended from the sun gear member 60.

The sun gear support body 58 is mounted about the input shaft member 30 by a bearing member 35 to achieve relative rotation therebetween.

The sun gear member 60 is provided with first drive gear teeth 64 and second drive gear teeth 66 used to drive respective planet gear members in a planetary gear set means as will be explained.

The first drive gear teeth 64 are engageable with the input planet gear members 40 and the second drive gear teeth 66 are engageable with output planet gear members being part of the ring gear and carrier assembly 22 as will be noted.

The clutch support body 62 includes 1) a low range clutch section 68; and 2) a high range clutch section 70. The low range clutch section 68 is provided with a plurality of spaced adjacent parallel low range clutch plates 72. The high range clutch section 70 is provided with a plurality of spaced adjacent parallel high range clutch plates 74 which are to be utilized in a manner to be explained.

The low range gear and clutch assembly 18 includes a low range input gear assembly 76 and a low range clutch assembly 78. The low range input gear assembly 76 includes a low range shaft member 80 integral with a low range gear member 82. The low range gear member 82 acts as a power transfer assembly from the low range gear drive section 46 to the low range clutch assembly 78.

The low range shaft member 80 is mounted on a bearing member 35 which can be attached to a transmission housing or the like in a conventional manner.

The low range gear member 82 is provided with a driven gear section 84 and a drive gear section 86. The driven gear section 84 is provided with driven gear tooth members 88 with power from the low range gear drive section 46 of the input gear drive assembly 34. The driven gear section 84 is provided with driven gear tooth members 88 driven by the low gear drive member 50.

The drive gear section 86 is provided with drive gear tooth members 90 which are engageable with a portion of the low range clutch assembly 78.

The low range clutch assembly 78 includes 1) a clutch support body 92; 2) spaced adjacent parallel low range viscous clutch plates 94 mounted on the clutch support body 92; and 3) a low range clutch piston 96 which is operable in a known manner in a viscous clutch means to provide variable output on actuation of the low range clutch piston 96 through the low range clutch plates 72 on the clutch support body 62 and the low range viscous clutch plates 94 on the clutch support body 92 as will be explained.

The clutch support body 92 is rotatably mounted about the input shaft member 30 by a bearing member 35 to allow relative rotation therebetween.

The high range gear and clutch assembly 20 includes 1) a high range input gear assembly 98; and 2) a high range clutch assembly 100 operably connected to the high range input gear assembly 98.

The high range input gear assembly 98 includes a high range shaft member 102 integral with a high range gear member 104. The high range shaft member 102 is mounted on a bearing member 35 which, in turn, is connected to a portion of the transmission housing in a conventional manner to permit rotation thereof.

The high range gear member 104 includes a driven gear portion 106 and a drive gear portion 108. The driven gear portion 106 has driven tooth members 110 engageable with the high gear drive member 54 on the high range gear drive section 48 of the input gear drive assembly 34. This causes rotation of the high range shaft member 102 and the drive gear portion 108 which, in turn, engages a portion of the high range clutch assembly 100 as will be explained.

The high range clutch assembly 100 includes 1) a high range clutch support body 114 mounted on a bearing member 35 so as to permit relative rotation of the adjacent clutch elements; 2) a plurality of spaced adjacent parallel high range viscous clutch plates 116; 3) a high range clutch piston 118 which is operable to be moved inwardly to obtain engagement of the high range viscous clutch plates 116 to the high range clutch plates 74 as a viscous clutch means in a known manner.

The high range clutch piston 118 is operable to provide variable output and being actuated by a governor or other electronic controls to maintain the constant RPM output of the output gear and shaft assembly 26 as will be noted.

The ring gear and carrier assembly 22 includes a ring carrier plate member 120 integral with a ring gear member 122 and a plurality of ring carrier planet support shafts 124, each adapted to receive and support an output planet gear member 126 thereon.

The ring gear member 122 has a plurality of ring gear tooth members 128 which are engageable with the input planet gear members 40 of the input carrier plate assembly 32.

The ring carrier planet support shafts 124 have a bearing member 35 thereon to support the respective output planet gear members 126 thereon for relative rotation.

Each output planet gear member 126 is provided with planet gear tooth members 130 engageable with the output ring gear assembly 24.

The output ring gear assembly 24 includes an output support plate member 134 having integral therewith 1) an input drive ring gear member 136; and 2) an output drive gear member 138.

The output support plate member 134 is mounted on a bearing member 35 that can be attached to a portion of the transmission housing or the like in a conventional manner.

The input drive ring gear member 136 has input gear tooth members 140 which are engageable with the respective output planet gear members 126 in a conventional manner.

The output drive gear member 138 is provided with output gear tooth members 142 which are engageable with a portion of the output shaft assembly 26 as will be explained.

The output gear and shaft assembly 26 includes an output driven gear member 144 which is integral with an output shaft member 146. The output shaft member 146 is mounted on bearing members 35 which are connected in a known manner to the transmission housing or the like.

The output driven gear member 144 is provided with driven gear tooth members 148 which are engageable with the output gear tooth members 142 on the output drive gear member 138 in order to drive the output shaft member 146.

The output shaft member 146 is driven at a constant predetermined RPM which then can be utilized to drive a device that benefits from a constant input.

A speed or RPM governing device 149 is connected to and driven by the output gear tooth members 142 on the output drive gear member 138. Then, depending on the output speed desired for the output shaft member 146, the governing device 149 would control operation of the low range clutch piston 96 or the high range clutch piston 118.

Another embodiment of a constant output transmission means is shown in FIG. 2 as being substantial identical to the first embodiment of the constant output transmission apparatus 12 but having certain elements thereof that can be removed. For example, the following elements are removed from the embodiment of the constant output transmission apparatus 12 to form the constant output transmission assembly 160, namely, the elements being 1) the high range gear and clutch assembly 20; 2) the ring gear and carrier assembly 22; 3) the high range clutch section 70 with its associated high range clutch plates 74; and 4) the high range clutch piston 118.

As shown in FIG. 2, the constant output transmission assembly 160 includes 1) an input gear and drive shaft assembly 161; 2) a clutch and sun gear assembly 164; 3) the output ring gear assembly 24; and 4) the output shaft assembly 26.

The input gear and drive shaft assembly 161 includes 1) the input shaft member 30 mounted on bearing member 35; 2) an input carrier plate assembly 32; and 3) an input drive gear assembly 162.

The input carrier plate assembly 32 includes the same input plate support shafts 38 having respective input planet gear members 40 mounted thereon as previously described.

The input drive gear assembly 162 is provided with the gear drive section 46 thereon to drive a portion of the gear and clutch assembly 18 as will be noted.

The input gear and drive shaft assembly 161 in the second embodiment is substantially identical as in the first embodiment to the input drive and gear shaft assembly 14 except that the high range gear drive section 48 has been eliminated therefrom as using only one viscous clutch means.

The clutch and sun gear assembly 164 includes the previously described sun gear support body 58 and having a sun gear member 60 and a clutch support body 62. The sun gear member 60 has only the ring gear teeth 66 thereon engageable with the input planet gear members 40.

The clutch support body 62 has a clutch section 68 to support a plurality of spaced clutch plates 72.

The clutch and sun gear assembly 164 is substantially identical to the sun gear and clutch assembly 16 in the first embodiment except having the high range clutch section 70 omitted therefrom.

The low range gear and clutch assembly 18 is as described in the first embodiment having an input gear assembly 76 and a clutch assembly 78. The input gear assembly 76 includes the shaft member 80 mounted on a bearing member 35 and integral therewith is a gear member 82.

The gear member 82 has a driven gear section 84 and a drive gear section 86. The driven gear section 84 is provided with driven gear tooth members 88. The drive gear section 86 is provided with drive gear tooth members 90 engageable with a portion of the clutch assembly 78.

The clutch assembly 78 has a clutch support body 92 with spaced adjacent parallel viscous clutch plates 94 connected thereto. A clutch piston 96 is used to actuate the viscous clutch means in a conventional manner.

Omitted from the constant output transmission assembly 160 is the high range gear and clutch assembly 20 and the ring gear and carrier assembly 22 of the first embodiment.

The output ring gear assembly 24 is as described in the first embodiment having an output support plate member 134 and integral therewith an input drive ring gear member 136 and an output drive gear member 138.

The input drive ring gear member 136 has input gear tooth members 140. The output drive gear member 138 has output gear tooth members 142 engageable with the output shaft assembly 26 and the RPM governing device 149.

The output shaft assembly 26 is identical to that described in the first embodiment having an output driven gear member 144 integral with an output shaft member 146.

The output driven gear member 144 has drive gear tooth members 148 engageable with the output drive gear member 138 to cause rotation of the output shaft member 146 which is supported on the bearing member 35.

As in the first embodiment, the output shaft member 146 is controlled by the RPM governing device 149 or other electronic means to maintain the rotation of the output shaft member 146 at a constant and predetermined rotation which may be used to drive any device that benefits from a constant input.

Without any of the previously described viscous clutch means being engaged, it is noted that the input carrier plate assembly 32 and the input planet gear members 40 would rotate without driving the sun gear and clutch assembly 16 or the ring gear and carrier assembly 22 which is in the non-drive or freewheeling condition so that the output shaft member 146 would not be rotating.

Further, it is noted that in the embodiment of FIG. 1, we would operate either the low range gear and clutch assembly 18 or the high range gear and clutch assembly 20 but not both at the same time. As the input shaft member 30 RPM changes for example from a 6000 to above 6000 RPM, the governing device 149 would automatically operate to provide an instant switch from a low range clutch means to a high range clutch means through actuation of the low range clutch piston 96 or the high range clutch piston 118, both operating on signals from the governing device 149.

When either the low range gear and clutch assembly 18 or the high range gear and clutch assembly 20 are actuated, it will then operate to rotate the sun gear and clutch assembly 16 to achieve the constant predetermined RPM output to the output shaft member 146.

When the low range gear and clutch assembly 18 is fully engaged, this operates to rotate the sun gear and clutch assembly 16 at the identical RPM speed of the input shaft member 30 to achieve the output RPM for example of 7000 to the output shaft member 146. On having an input RPM above 6000, the low range gear and clutch assembly 18 disengages and the high range gear and clutch assembly 20 is engaged and controlled by the governing device 149.

USE AND OPERATION OF THE INVENTION

In the use and operation of the constant output transmission apparatus 12 of this invention, it is to be noted that the RPM power input to the input shaft member 30 may have a variable input for example from 4,000–8,000 RPM which might be found on the output turbine shaft on a jet engine on a commercial aircraft. However, it is noted that the variable input on the input shaft member 30 can be supplied from various other power supply sources.

The variable input to the input shaft member 30 is altered by the use of two sets of ring gear assemblies, being the ring gear and carrier assembly 22 and the output ring gear assembly 24, which is controlled through the low range gear and clutch assembly 18 and the high range gear and clutch assembly 20 to achieve a constant output to the output shaft member 146 at a constant RPM, such as 7000 RPM.

This constant 7000 RPM to the output shaft 146 will then be governed and controlled by a governing device 149 as noted in FIG. 1. The 7000 RPM rotating output member 146 is thereupon, through various known means, could be to an electrical generator to produce constant voltage output therefrom.

In order to achieve from a variable RPM 4000–8000 input and to achieve the output RPM at a constant 7000, please refer to the following chart that sets forth how this is being achieved.

HIGH EFFICIENCY CONSTANT OUTPUT TRANSMISSION APPARATUS 12 OUTPUT = 7000 RPM

| Variable RPM Input to Input Shaft Member 30 | Variable RPM Input to Ring Gear and Carrier Assembly 22 | Variable RPM Input to Clutch Support Body 92 or High Range Clutch Support Body 114 | Variable RPM Input to Sun Gear Member 60 or Output Planet Gear Members 40 and 126 |
| --- | --- | --- | --- |
| 4000 | 5200 | 1600 | 1600 |
| 4250 | 5350 | 1700 | 2050 |
| 4500 | 5500 | 1800 | 2500 |
| 4750 | 5650 | 1900 | 2950 |
| 5000 | 5800 | 2000 | 3400 |
| 5250 | 5950 | 2100 | 3850 |
| 5500 | 6100 | 2200 | 4300 |
| 5750 | 6250 | 2300 | 4750 |
| 6000 | 6400 | 5199 | 5200 |
| 6250 | 6550 | 5416 | 5650 |
| 6500 | 6700 | 5633 | 6100 |
| 6750 | 6850 | 5849 | 6550 |
| 7000 | 7000 | 6066 | 7000 |
| 7250 | 7150 | 6282 | 7450 |
| 7500 | 7300 | 6499 | 7900 |
| 7750 | 7450 | 6716 | 8350 |
| 8000 | 7600 | 6932 | 8800 |

NOTES
1) Ring gear to sun gear ratio is 4 to 2;
2) The variable input from 4000 to 6000 RPM is controlled and maintained at 7000 RPM output by the low range gear and clutch assembly 18;
3) The variable input from 6000 to 8000 RPM is controlled and maintained at 7000 RPM output by the high range gear and clutch assembly 20.

In the use and operation of the first embodiment of the constant output transmission apparatus 12 as shown in FIG. 1, it is noted that the variable RPM input is applied to the input drive gear shaft assembly 14 which, in turn, rotates the input carrier plate assembly 32 which also provides rotation to the input planet gear members 40.

As neither of the viscous clutch means, namely the low range clutch assembly 78 or the high range clutch assembly 100, not actuated by the respective low range clutch piston 96 and high range clutch piston 118, then the system is in a freewheeling status and would provide no RPM output to the output shaft member 146.

On having a low range RPM input between 4000–6000, the low range clutch assembly 78 is energized on movement of the low range clutch piston 96 which is controlled by the governing device 149.

This operates to transfer the rotational speed of the input shaft member 30 through the input gear drive assembly 34 which then is transferred to cause rotation of the clutch support body 92 and which is then transferred on activation of the low range clutch piston 96 into the input planet gear members 40 and the output planet gear members 126.

At this time, this transfers rotational movement to the ring gear and carrier assembly 22 and the output ring gear assembly 24.

At the rotation of dual planetary gear set means, power is transferred from the output drive gear member 138 to the output driven gear member 144 and the output shaft member 146 at a predetermined constant RPM.

On reaching an input RPM of 6000 on the input shaft member 30, the low range gear and clutch assembly 18 is de-energized by not applying pressure to the low range clutch piston 96. Instead, the governing device 149 is operable to switch to the high range gear and clutch assembly 20 and, more particularly, to energize the high range clutch piston 118 as controlled by the governing device 149. This then transfers RPM through the input planet gear members 40 and the output planet gear members 126 which rotates the output drive gear member 138 to drive the output driven gear member 144 and the output shaft member 146 on the output shaft assembly 26.

In the first embodiment of the constant output transmission apparatus 12, it is noted that the use of two viscous clutch means to cover a low range 4000–6000 RPM and a high range 6000–8000 RPM provides for more and greater efficiency of operation and more accuracy to maintain the constant output of 7000 RPM.

On referring to FIG. 2, a constant output transmission assembly 160 is noted therein which is substantially identical in operation to the constant output transmission apparatus 12 using less moving parts but not quite as efficient.

On referring to FIG. 2, it is noted that the constant output transmission assembly 160 has the following elements removed from FIG. 1 to achieve the more economical to manufacture structure as shown in FIG. 2. More specifically, the ring gear and carrier assembly 22 has been removed; the output ring gear assembly 24 has been moved over so as to be in contact with and driven by the input planet gear members 40 on the input carrier plate assembly 32; the high range gear and clutch assembly 20 along with the high range clutch assembly 100 have been removed and, therefore, no high range input gear assembly 98 or high range clutch assembly 100 is utilized in this second embodiment.

In the use and operation of the second embodiment, being the constant output transmission assembly 160, it is noted that a variable input would be applied to the input shaft member 30 which is then transferred outwardly to the input carrier plate assembly 32 and, more specifically, the input planet gear members 40.

In the input gear drive assembly 34, it is noted that the low range drive gear section 46 is being utilized alone to drive the low range gear and clutch assembly 18 as described in the first embodiment.

In this embodiment of FIG. 2, if the low range clutch piston 96 has not been energized or actuated by the governing device 149, then this will also operate in a freewheeling condition, not transferring any of the RPM input to the input shaft member 30 to the output shaft member 146.

On providing RPM to the input shaft member 30 and on activation of the low range clutch piston 96, it is seen that the input power to the low range input gear assembly 76 is transferred to the low range clutch assembly 78. More specifically, the clutch support body 92 and interconnected rotating viscous clutch plates 94 transfers power which is then transferred through the sun gear support body 58 to drive the input planet gear members 40 which is transferred to the low range gear and clutch assembly 18 to the output shaft assembly 26 and, more specifically, to the constant RPM output to the output shaft member 146.

The governing device 149 would provide the necessary actuation of the low range clutch piston 96 and constantly monitor the output through use of only one ring gear means, namely the output ring gear assembly 24, to again achieve constant RPM output to the output shaft member 146.

Although my outline for describing the various parts and elements of the constant output transmission apparatus 12 and the constant output transmission assembly 160 is sufficient to clearly understand how the invention is put together and operates, this outline presents some difficulty in being able to most efficiently and broadly present the claims herein. Therefore, I will try to broadly describe viscous clutch means and planetary gear set means so it can be more broadly claimed herein.

First, on input to the input shaft member 30, there is a first planetary gear set means which is normally defined as the combination of a sun gear member, planetary gears, and a ring gear member. In this case, a first planetary gear set means includes the sun gear 60, the input planet gear members 40 being driven by the input plate member 36, and a ring gear member 122.

A second set of planetary gear set means includes the sun gear 60, the output planet gear members 126, and the output drive ring gear member 136.

Further, we have a first or low range viscous clutch means which is comprised of the elements of a first portion of the clutch means comprising the low range clutch assembly 78 having the clutch support body 92 and the low range viscous clutch plates 94 which are engageable and actuated by the low range clutch piston 96.

This first viscous clutch means includes a second portion which includes the connection to the sun gear member 60, namely, clutch support body 60, having the low range clutch section 68 with the low range clutch plates 72 connected thereto.

The actuator low range clutch piston 96 is operable to engage the low range clutch plates 72 and low range viscous clutch plates 94 in a known manner controlled by the governing device 149.

In the second embodiment, being the constant output transmission assembly 160, it is noted that only this first viscous clutch means is utilized therein which is actually the same as described for the low range viscous clutch means.

A second viscous clutch means is identified as having all the elements of the high range clutch means, namely a primary or first portion being the high range clutch assembly 100, having the high range clutch support body 114 with the high range viscous clutch plates 116 connected thereto.

This cooperates with a secondary or second portion of the second viscous clutch means, namely, having the high range clutch section 70 with the high range clutch plates 74 connected thereto which cooperates with the high range clutch support body 114 and the high range viscous clutch plates 116. This second clutch means is actuated by the high range or secondary clutch piston 118 to engage in a driving condition the aforementioned high range viscous clutch plates 116 and high range clutch plates 74 and controlled by the governing device 149.

The grouping of the planetary gear set means and the two viscous clutch means is deemed necessary in order to properly set forth claimed subject matter in this application.

The constant output transmission apparatus or assembly of this invention provides a continuous output RPM from a variable RPM input which is relatively economical to manufacture compared to prior art transmission structures; reliable in use; and substantially maintenance free.

While the invention has been described in conjunction with preferred specific embodiments thereof, it will be understood that this description is intended to illustrate and not to limit the scope of the invention, which is defined by the following claims:

I claim:

1. A constant output transmission apparatus receiving a continuously variable power inlet source that is transferred to a constant power outlet source, comprising:

a) an input drive and gear shaft assembly including an input shaft member connected to and driven by a variable power inlet source, said input shaft member connected to an input gear drive assembly and an input carrier plate assembly;

b) a first planetary gear set assembly including a sun gear member rotatably mounted about said input shaft member, input planet gear members rotatably connected to said input carrier plate assembly and driven by said sun gear member and a ring gear member engageable with and driven by said input planet gear members;

c) a second planetary gear set assembly including said sun gear member, output planet gear members rotatably connected to said ring gear member and driven by said sun gear member, and an output ring gear member driven by said output planet gear member;

d) an output shaft member connected to and driven by said output ring gear member at a constant predetermined RPM; and e) a low range viscous clutch means having 1) a first portion connected to and driven by said input shaft member; 2) a second portion connected to and driven with said sun gear member; and 3) a clutch piston operable to achieve engagement between said first portion to said second portion to rotate said sun gear member, said first planetary gear set assembly, second planetary gear set means, and said assembly shaft member at the constant predetermined RPM.

2. A constant output transmission apparatus as described in claim 1, wherein:

a) a governing device is connected to said output ring gear member operable to achieve input and information relative to the RPM rotation of said output ring gear member as to the RPM of said output shaft member and control operation of said clutch piston to maintain a predetermined constant RPM output of said output shaft member.

3. A constant output transmission apparatus as described in claim 1, including:

a) a high range viscous clutch means having a first clutch portion connection to and driven by said input shaft member to drive a first set of high range viscous clutch plates;

b) a second clutch portion of said high range viscous clutch means connected to said sun gear member to drive a second set of high range viscous clutch plates; and c) a clutch piston operable to engage said first and second set of high range viscous clutch plates to cause rotation of said sun gear member to drive said first planetary gear set assembly and said second said planetary gear set assembly to provide an output to said output shaft member at the constant predetermined RPM.

4. A constant output transmission apparatus as described in claim 1, wherein:

a) said input gear drive assembly includes a low range gear drive section connected to said first portion of said low range viscous clutch means to continuously rotate said first portion.

5. A constant output transmission apparatus as described in claim 3 wherein:

a) said input gear drive assembly includes a high range gear drive section connected to said first clutch portion of said high range viscous clutch means to continuously rotate said first clutch portion.

6. A constant output transmission assembly connected to a variable power inlet source that is transferred to a constant RPM power outlet source, comprising:

a) an input gear and drive shaft assembly including an input drive shaft connectable to and rotated by a variable power inlet source;

b) said input drive shaft having a gear drive section;

c) a planetary gear set assembly including a sun gear member rotatably mounted on said input drive shaft; input planet gear members connected to said input shaft member and engageable with said sun gear member; and a ring gear member engageable with and driven by said input planet gear members;

d) an output power source connected to and driven at a predetermined constant RPM by said ring gear member;

e) a clutch means including a first clutch portion connected to and driven by said gear drive section on said input drive shaft and a second clutch portion connected to and driven by said sun gear member;

f) an actuator member operable to engage said first clutch portion with said second clutch portion to rotate said sun gear member, said input planet gear members, said ring gear member, and operable to drive said output source at the predetermined constant RPM.

7. A constant output transmission assembly as described in claim 6, wherein:

a) said first clutch portion and said second clutch portion engageable by said actuator member which is a clutch piston to achieve rotation of said sun gear member which then rotates said input planet gear members which rotates said ring gear member and said output source at the constant predetermined RPM.

8. A constant output transmission assembly as described in claim 6, wherein: a) said ring gear member has an output drive gear member engagable with said output source to drive at the predetermined constant RPM.

9. A constant output transmission assembly as described in claim 6, including:

a) a governing device connected to said ring gear member operable to achieve input and information relative to the RPM rotation of said output power source to the RPM to control operation of said actuator member to maintain a predetermined constant RPM output of said output power source.

10. A constant output transmission apparatus operable to convert a variable power source to a constant RPM output for driving a device that benefits from a constant input, comprising:

a) an input drive and gear shaft assembly connected to a variable power source to drive an input shaft member;

b) a first planetary gear set means connected to said input shaft member operable to power a first input planet gear member;

c) a first low range clutch means connected to said first planetary gear set means to adjust the RPM of said input planet gear member;

d) said input planet gear member engages an input drive ring gear member that drives an output drive gear member; and e) said output drive gear member connected to an output shaft assembly operable to drive an output shaft member at a constant RPM.

11. A constant output transmission apparatus as described in claim 10, wherein:
   a) said first planetary gear set means includes a sun gear member rotatably mounted about said input shaft member; second input planet gear and said first input planet gear members connected to said sun gear member; and a ring gear member connected to and driven by said first and second input planet gear members; and
   b) said ring gear member connected to said input drive gear member to drive said output shaft assembly at a constant RPM.

12. A constant output transmission apparatus as described in claim 10, including:
   a) said first low range clutch means including a first portion connected to and driven by said input shaft member, a second portion connected to and driven by said first planetary gear set means; and a clutch piston operable to engage said first portion and said second portion to drive said output shaft member at the constant RPM.

13. A constant output transmission apparatus as described in claim 12, including:
   a) a second clutch means including a primary portion connected to and driven by said input shaft member, a secondary portion connected and driven by said first planetary gear set means; and a secondary clutch piston operable to engage said primary portion and said secondary portion to drive said output shaft member at the constant RPM.

14. A constant output transmission apparatus as described in claim 13, wherein:
   a) said first clutch means and said second clutch means are viscous clutches;
   b) a governing device is operably connected to increase rotation of said output shaft member to the constant RPM; and
   c) said governing device is operably connected to said second clutch means to decrease rotation of said output shaft member to the constant RPM.

* * * * *